Oct. 8, 1940.    W. C. AGERELL ET AL    2,217,302
RADIATOR AND RADIATOR SHUTTER ASSEMBLY
Filed May 15, 1937    3 Sheets-Sheet 3
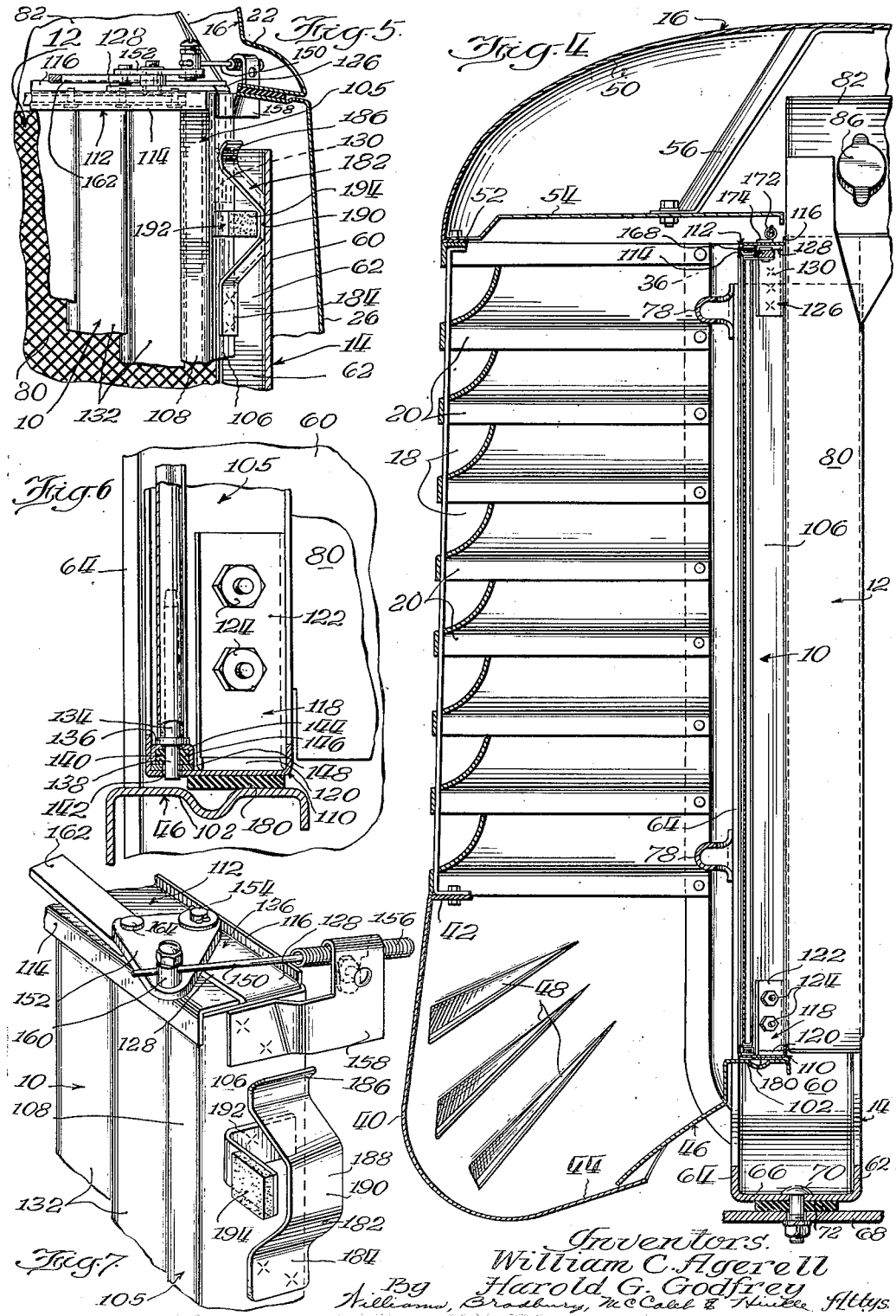
Inventors.
William C. Agerell
Harold G. Godfrey Patented Oct. 8, 1940

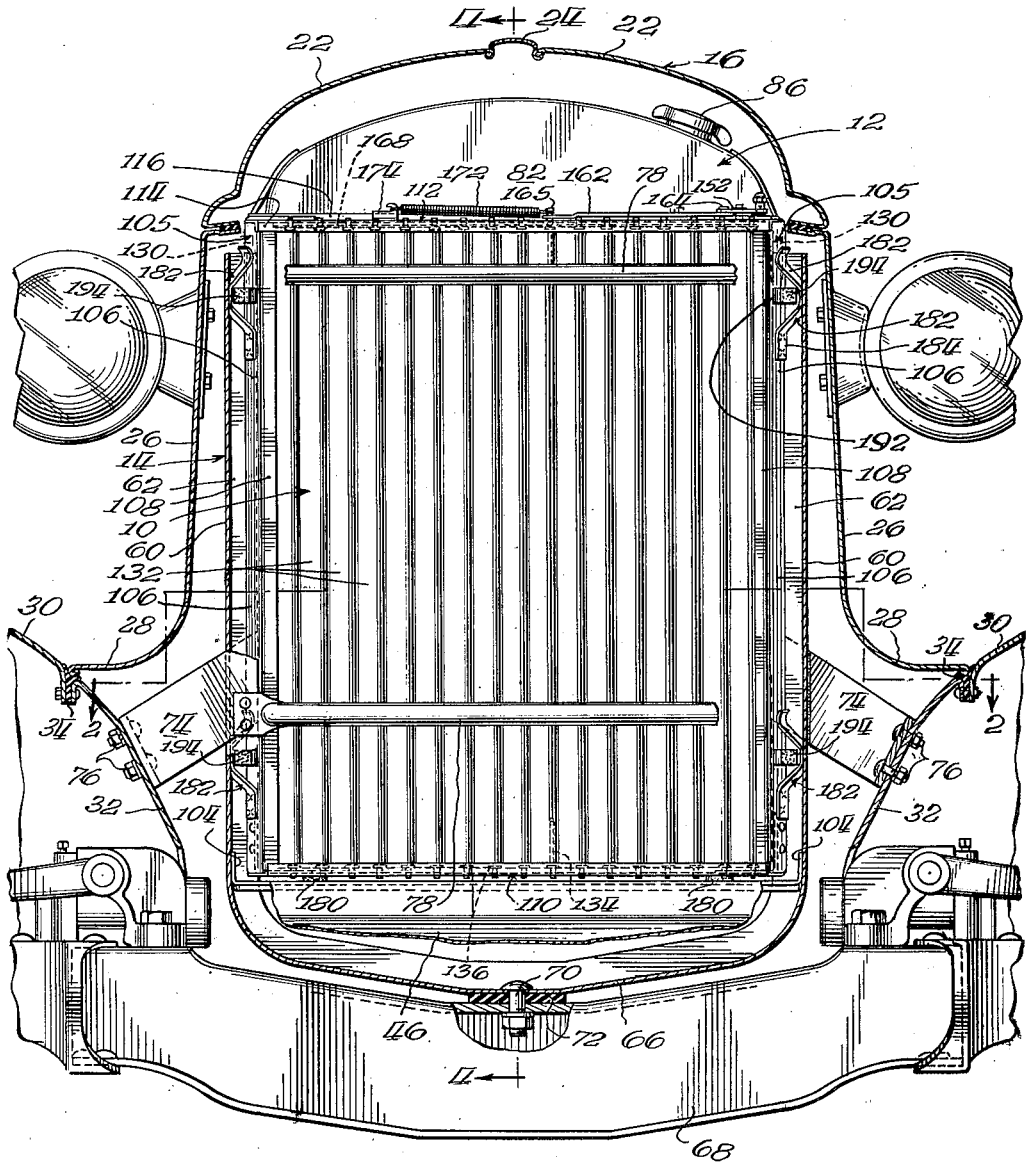

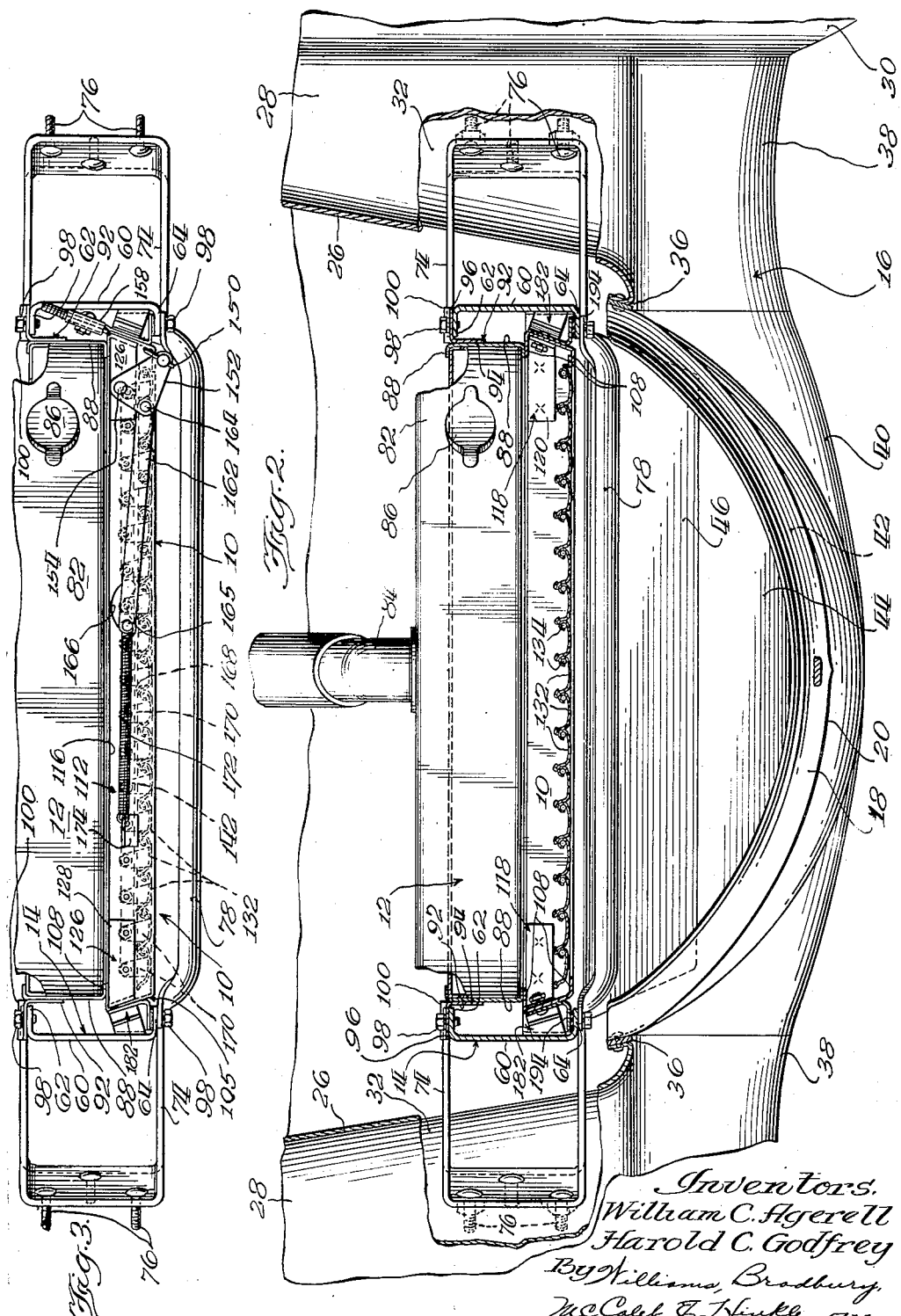

2,217,302

UNITED STATES PATENT OFFICE 2,217,302

RADIATOR AND RADIATOR SHUTTER ASSEMBLY

William C. Agerell and Harold C. Godfrey, Chicago, Ill., assignors to Pines Winterfront Company, Chicago, Ill., a corporation of Delaware Application May 15, 1937, Serial No. 142,859

4 Claims. (Cl. 180—69)

The present invention relates to a radiator and radiator assembly for use with vehicles such as automobiles, airplanes, and the like. Manufacturers of automotive vehicles, particularly automobiles, have always been confronted with the problem of meeting the demands of users for those refinements which, although not actually necessary in all vehicles, add either to the efficiency of operation or to the comfort of the driver and passengers. Demands of this nature may arise in the case of automobiles from the fact that these vehicles are used in localities subjected to different atmospheric conditions or because certain owners demand the added refinements others do not desire.

Among the refinements of this general nature may be included radiator shutters. It is known that radiator shutters add both to the efficiency of operation of the automobile and to the comfort of those riding therein, but that they are not required on automobiles designed for use in tropical countries, and all car owners do not demand them. The manufacturer and his agents are not only confronted with the above situation, but must also meet the demands of the owner who decides to install a radiator shutter after he has used the automobile for some time.

These problems are complicated by the fact that the shutter to be most effective should be placed in front of the radiator, and consequently for esthetic reasons cannot be simply attached to the front of the car. Further difficulties have arisen because of changes in the design of the front of an automobile.

An object of the present invention is to provide a radiator and radiator shutter assembly comprising a supporting means so constructed and arranged that the radiator shutter may be easily, conveniently, and economically assembled in spaced relation to the radiator either when the car is first assembled at the factory or whenever circumstances make it desirable to add a shutter.

A further object of the invention is to provide a new and improved radiator shutter.

A further object of the invention is to provide a radiator shutter assembly in which the shutter is removably mounted in spaced relationship to the radiator.

A further object of the invention is to provide a shutter removably mounted in suitable supporting means and provided with resilient means engaging the supporting means for preventing rattling of the shutter.

Another object of the invention is to provide a new and improved supporting means for a radiator and radiator shutter.

A further object is to provide a new and improved supporting means for a radiator shutter.

Other objects and advantages of the invention will appear in the course of the ensuing description, in the course of which reference is had to the accompanying drawings, in which:

Fig. 1 is a front elevation, partly in section, showing the radiator and radiator shutter assembly of the present invention mounted upon the chassis of an automobile;

Fig. 2 is a transverse horizontal section, taken along the line 2—2 of Fig. 1;

Fig. 3 is a top plan view of the radiator and radiator assembly shown in Figs. 1 and 2;

Fig. 4 is a longitudinal vertical section, taken along the line 4—4 of Fig. 1;

Fig. 5 is a fragmentary elevational view, showing a portion of Fig. 1 on an enlarged scale;

Fig. 6 is a sectional detail view also showing a portion of Fig. 1 on an enlarged scale; and Fig. 7 is a fragmentary enlarged perspective view, showing details of construction of the radiator shutter unit.

Referring first to Fig. 1, the shutter unit of the present invention, designated as a whole by reference numeral 10, is shown in its normal installed position adjacent to the radiator 12, in front of which it is supported by the novel supporting means indicated generally by reference numeral 14. The shutter unit, radiator, and supporting means lie and are concealed within a multiple piece structure forming a shell 16. The several parts of this shell are finished and collectively constitute the finishing piece for the radiator core.

While the specific construction of the shell forms no part of the present invention, a multiple piece structure has been illustrated and is described briefly hereinafter. However, it should be understood that a single integral finishing piece, such as the well known radiator shell that has been used for many years, may be used equally well.

In the present instance, the shell 16 comprises a number of parts so constructed and arranged as substantially to encircle the radiator shutter unit and their supporting means in the plane of the radiator and to provide an open panel 18 in front of the shutters and through which air may pass rearwardly to the shutter unit and radiator core. In order to improve the external appearance of the outer shell, the panel 18 may be partially closed by suitable grille work 20, as shown in Fig. 4.

Referring now more particularly to Figs. 1, 2 and 4, it may be seen that the shell 16 comprises a pair of upper panels 22 hingedly mounted upon a narrow central support 24 and a pair of side panels 26 detachably mounted in suitable manner to form the side walls of the shell. The lower portions 28 of the side panels extend outwardly to meet the junction of fenders 30 and the downwardly and inwardly extending skirts 32, which are mounted in suitable manner upon the chassis of the automobile. Rubbing between the fenders, skirt, and side panels is prevented by the usual strip 34 of fabric inserted between the fenders and skirts and upon which the lower edge of the side panel rests. The front edges of the side panels overlap the rear edges of the grille work, as indicated at 36, at a point located forwardly of both the shutter unit 10 and radiator core 12.

The lower portion or bottom of the shell 16 is built from a pair of symmetrical extensions 38 projecting forwardly and downwardly from the horizontal portions 28 of the side panels and by an intermediate member 40 spaced between extensions 38. The member 40 is of curvilinear section, and has an upper horizontally disposed peripheral flange 42 supporting the grille work and an upwardly and rearwardly projecting portion 44. The portion 44 and a forwardly and downwardly extending portion 46, hereinafter called an apron, and described in greater detail, constitute a baffle for directing air flowing rearwardly through the slots 48 formed in the member 40 to the shutter and radiator.

The upper forward portion or top of the shell 16 is formed by a bonnet-like somewhat spherically shaped piece 50 provided with a lower peripheral horizontally disposed flange 52 adapted to be secured to the top of the grille work 20. The bonnet may be constructed as a removable unit with a horizontally disposed baffle 54 and a bracket 56 connecting the latter to the piece 50.

The novel supporting means 14 of the present invention is constructed of an integral piece of metal having a channel section formed in a U shape. The bottom 60 of the channel has a width sufficient comfortably to receive the radiator core and shutter unit in a manner to be described in greater detail hereinafter, and the rear and front flanges 62 and 64, respectively, of the support are parallel to each other and to the faces of the radiator core. The transversely extending bottom 66 of the U-shaped support is adapted to be secured to the front cross-piece 68 of the chassis by means of a nut and bolt 70. The whole unit is resiliently mounted upon the cross-piece 68 by interposing a resilient cushion 72, preferably made of rubber, between the cross-piece and the U-shaped member, as clearly shown in Fig 1.

The U-shaped supporting means 14 is given additional rigidity by bracing it to the skirts 32, to which it may be rigidly secured by a pair of diagonally disposed U-shaped brackets 74, secured by bolts 76 to the apron. The arms of the bracket are welded to the front and rear flanges of the upright portions of the U-shaped support 14 about a third of the way from the bottom of the support. The upright portions of the supporting means 14 are prevented from spreading apart by a pair of fabricated rods 78 welded or otherwise suitably secured at their ends to the front flanges 64. One of the rods is spaced relatively close to the bottom of the support, and the other near the top.

The radiator 12 comprises the usual core 80, an upper tank 82, and a lower tank, which has been omitted for the purpose of simplification of the drawings. The upper tank is provided with the usual water conduit 84 and a removable cap 86, through which water may be supplied to the cooling system.

The radiator structure comprises channel sections 88 secured to the vertical side walls of the core 80. These channel sections not only add to the structural strength of the radiator, but also furnish a convenient means for supporting the radiator core.

The radiator core is supported upon the rear flange 62 of the U-shaped support 14 by means of 90-degree angle irons 92 having the outer sides of the legs 94 thereof welded to the rear portions of the channel members 88. The transversely extending legs 96 of the angles 92 are secured to the rear flange 62 by a plurality of bolts 98 extending the length of the angle irons. The legs 96 of the angle irons 92 may be provided with outwardly pressed portions 100 adapted to fit around the rear legs of the U-shaped brackets 74, as illustrated in Figs. 2 and 3.

It may be seen that the radiator structure may be readily and conveniently mounted in the U-shaped support and just as conveniently removed therefrom simply by loosening the nuts 98 and sliding the radiator structure in a vertical plane. From the above description of the manner in which the radiator core is supported by the U-shaped support 14, it may be noted that the entire area of the core is adapted to be contacted by the air flowing rearwardly therethrough. This advantageous feature results from the fact that the flanges 62 and 64 are both displaced laterally from the side walls of the radiator core.

The shutter unit, which is about to be described in detail, is adapted slidably to be mounted in the supporting means, previously described, in a pair of opposed grooves or channels defined by the front face of the radiator 12, and by the opposed inwardly extending flanges 64 of the upright portions of the U-shaped support 14.

The unit is supported at its bottom by means of the previously mentioned apron 46, which is provided with a horizontal rear portion 102 extending transversely of the shutter unit-receiving opening and provided with end flanges 104 adapted to be welded to the bottom 60 of the U-shaped channel support at a suitable height.

While the apron 46 has been illustrated as welded to the U-shaped support, it is contemplated that the apron may be otherwise secured thereto, and in fact that it may be secured either to the chassis or to the enclosing shell, as occasion demands.

The shutter unit itself is constructed of a pair of oppositely disposed side frames 105, having substantially a channel section, with the bottoms 106 thereof disposed at an angle with respect to the flanges 108, thereby to define a space of substantially triangular section between the shutter unit and the interior of the channel support 14, for a purpose that will appear shortly.

The frame is completed by a bottom frame member 110 of channel section and a top frame member 112, the front edge of which is provided with a downwardly depending flange 114, and the rear edge of which is provided with an upwardly extending flange 116.

The frame members are united at their lower corners by a pair of right angled interior brackets 118, the horizontal portions 120 of which are preferably welded to the bottom frame 110, and the vertical portions 122 of which are secured by a pair of nuts and bolts 124 to the side frame members 105, as best illustrated in Figs. 4 and 6.

The frame members are united at their upper corners by a pair of right angled brackets 126, having their horizontal portions 128 welded to the upper side of the top frame member 112 and their vertical downwardly extending portions 130 welded to the inner sides of the bottom portions 106 of the side frames 105.

The frame structure just described is adapted to support a plurality of vertically disposed relatively narrow shutter blades 132 pivotally mounted in the bottom and top frame members. Each of the blades 132 is made of a relatively thin piece of sheet metal and has one edge thereof beaded to surround oppositely disposed pins 134 mounted at the opposite ends thereof, as may be noted from Fig. 6. The pins 134 are provided with a collar 136 adapted to abut against the ends of the shutters, and with an end portion 138 adapted to extend through suitable supporting and lubricating means 140 and apertures 142 in the top and bottom frame members. The supporting and lubricating means 140 may be constructed of a channel member 144 disposed in inverted position and extending substantially the width of the shutter unit and enclosing a lubricant containing strip 146 of leather or the like adapted to contact the end 138 of the pin. The open bottom of the U-shaped member 144 is closed by a plate 148, also provided with apertures through which the ends 138 of the pivot pins extend.

It should be noted that the apertures 142, in which the shutter blades are pivotally mounted, are located near the forward edges of the respective frame members so that when the blades are pivoted they will swing to the rear in the space enclosed by the frame members.

The shutter blades 132 are actuated by an operating mechanism adapted to be either manually or automatically controlled. In the drawings, a manually controlled operating mechanism has been illustrated, and it comprises a flexible wire 150 secured to a linkage member 152 mounted for rotation about a pivot pin 154 secured to the top frame member 112, as best shown in Fig. 7. The flexible wire 150 preferably extends to the dashboard of the automobile through a conduit 156 surounding the wire and supported by a bracket 158 welded to the outside of one of the side frame members 105 near its upper edge. The linkage member 152 is substantially triangular in shape and has a screw connector 160 secured to one corner thereof and adapted to connect the wire 150 to the linkage member. As the linkage member 152 is rotated in a counter-clockwise direction about the pivot pin 154, movement is transmitted to a link 162 pivotally secured to the linkage member 152 by a pin 164. The linkage member 162 is connected by a pin 165 extending through an arcuate aperture 166 provided in the top frame member to a link 168 extending the width of the shutter and located beneath the top frame member. The link 168 is pivotally connected to rearwardly extending projections 170 formed at the top of each shutter blade whereby when the triangular linkage member 152 is rotated the shutter blades are caused to pivot about the apertures in which they are mounted, and permit the flow of air through the radiator.

In the present instance, the shutters are biased into closed position by a helical spring 172 secured at one end to the link 162 and at its other end to a hook 174 fixedly mounted upon the upper side of the top frame member 112.

The shutter unit described above is positioned in front of and adjacent the radiator core and prevented from rattling by resilient means interposed between the side and bottom walls and the supporting means. The shuter unit is resiliently supported upon the apron 46 by a pair of resilient cushions 180 secured in suitable manner to the under side of the bottom frame member 110. The cushions 180 are preferably made of rubber and bonded or otherwise suitably secured in well known manner to the frame member in spaced-apart relationship.

The side frame members 105 of the shutter unit are resiliently spaced from both the bottom 60 of the U-shaped support 14 and the front flanges 64 thereof. The resilient spacing from the bottom 60 is accomplished by welding a pair of resilient spacing members 182 to the bottoms 106 of the side frame members 105. The construction of the resilient spacers 182 is illustrated best in Fig. 7, from which figure it may be noted that they comprise a vertical portion 184 welded or otherwise suitably fixed to the side frame member. The opposite ends 186 of the spacing members are made arcuate in section, and the intermediate portion 188 is curved and formed with a flat portion 190 adapted to bear directly against the bottom wall 60 of the support.

It is apparent that by fixedly securing one end of the spacing member and allowing the other end to be free, the shutter unit can be forced into the U-shaped support against the tension of the spacing member 182. The resilient spacing of the shutter unit from the front flanges 64 is accomplished by welding right angled brackets 192 in spaced-apart relationship upon each of the side frame members 105. It is preferred that the brackets be welded to the side walls substantially at the same height as the resilient spacing members 182. The laterally extending arms of the brackets 192 are provided with resilient rubber cushions 194 suitably bonded thereto and adapted to bear against the inner sides of the front flanges 64 when the shutter unit is inserted in position in the supporting means.

From the above description it is apparent that the radiator and shutter assembly of the present invention is adapted particularly for use with automobiles that are to be supplied with radiator shutters at the option of the purchaser. If the purchaser desires to install a radiator shutter before delivery of the car, the shutter can be installed in position at the factory before the enclosing shell is assembled. At this time it is a relatively simple matter to place the shutter unit in the support by sliding it vertically downward between the upright arms of the U-shaped supporting means 14, after which operation the enclosing shell may be assembled in the usual manner.

In case it is necessary to remove a shutter previously installed, after the car has been in use for some time, it is of course necessary to remove a portion of the enclosing shell in order that the shutter unit can be lifted bodily from its position in front of the radiator. In the illustrated embodiment it is necessary to remove the bonnet 50 lying directly above the radiator shutter unit. In other installations it may be necessary to remove other parts of the shell, but in any event these may be removed and the shutter unit lifted from the automobile.

In case it is desired to add a shutter to an automobile after it has been used for some time without one, it is apparent from the above description that the shell must be removed in part at least, in order to permit the insertion of the shutter unit in front of the radiator.

Whether the shutter unit be installed at the factory or at some later date, the installation can be made in a convenient, ready, and simple manner by persons not skilled in the art. Because of the interposition of the resilient means between the frame of the shutter unit and the portions against which the frame would normally abut, there is little likelihood that the frame unit will develop rattles. This is one reason why the installation of the shutter unit can be made by unskilled persons.

Furthermore, the present invention has the advantage that the radiator and supporting means may be constructed to receive the shutter unit at slightly greater cost than if constructed for the radiator alone.

While the invention has been disclosed in connection with the specific details of a preferred embodiment thereof, it must be understood that the invention is not intended to be limited to such details except in so far as set forth in the accompanying claims.

We claim:

1. In combination with a vehicle radiator core, a support therefor comprising a front wall lying in a plane parallel to the face of the radiator, said front wall being spaced forward from and defining with the front face of the core an opening having a substantially rectangular section, a shutter unit slidable downwardly into said opening, and means including a generally downwardly and forwardly extending apron supported by the vehicle structure and having a portion extending transversely of said opening for supporting said shutter unit.

2. In combination with an automobile chassis, a radiator core and the regular outer finishing shell surrounding the core, a substantially U-shaped support for the core constructed of an integral piece of steel having a channel section and secured in a vertical position upon said chassis, said channel section having a width greater than that of the core whereby the front flange of the channel section and front face of the core constitute a pair of grooves, a shutter unit comprising side, bottom, and top frame members slidable in said grooves and adapted to be inserted in place in front of the core or removed therefrom upon displacement of the upper portion of the finishing shell, means including an apron adapted to direct air toward said shutter for supporting said unit, and resilient means carried by the side frames of the unit adapted to engage the inside face of the front flange of said support for positioning said unit in said grooves.

3. In combination with a vehicle radiator core, a support therefor comprising a front wall lying in a plane parallel to the face of the radiator, said front wall being spaced forward from and defining with the front face of the core an opening having a substantially rectangular section, a shutter unit slidable into said opening, and means including a generally downwardly and forwardly extending apron supported by the vehicle structure and having a portion extending transversely of said opening for supporting said shutter unit.

4. In combination with a vehicle radiator core, a support therefor comprising a front wall lying in a plane parallel to the face of the radiator and spaced forwardly thereof, shutters removably mounted in the space between the front wall and the front face of the radiator, and means including a generally downwardly and forwardly extending apron supported by the vehicle structure and having a portion extending transversely of said space for supporting said shutter unit.

WILLIAM C. AGERELL.
HAROLD C. GODFREY.